United States Patent

Esibian et al.

[11] 4,059,743
[45] Nov. 22, 1977

[54] PLASMA ARC CUTTING TORCH

[76] Inventors: Eduard Migranovich Esibian, ulitsa Kikvidze, 4, kv. 21; Daniil Andreevich Dudko, ulitsa Anri Barbjusa, 22-26, kv. 113; Mikhail Evgenievich Danchenko, Bulvar Likhacheva, 3, kv. 53; Vasily Berkovich Malkin, prospekt Voroshilova, 31, kv. 305; Valery Andreevich Kozhema, ulitsa Dovnar-Zapolskogo, 6, kv. 59, all of Kiev, U.S.S.R.

[21] Appl. No.: 619,701

[22] Filed: Oct. 6, 1975

[51] Int. Cl.² ............................................. B23K 9/00
[52] U.S. Cl. ............................................. 219/121 P
[58] Field of Search .................. 219/121 P, 74, 75, 76, 219/145; 313/231.3

[56] References Cited

U.S. PATENT DOCUMENTS

| 3,242,305 | 3/1966 | Kane et al. | 219/121 P X |
| 3,375,392 | 3/1968 | Brzozowski et al. | 219/121 P X |
| 3,408,518 | 10/1968 | Strupczewski | 219/121 P X |
| 3,591,759 | 7/1971 | Stand | 219/76 |
| 3,641,308 | 2/1972 | Couch, Jr. et al. | 219/121 P |
| 3,790,742 | 2/1974 | Auer | 219/121 P |
| 3,928,745 | 12/1975 | Demars et al. | 219/121 P |
| 3,930,139 | 12/1975 | Bykhovsky et al. | 219/145 |
| 3,944,778 | 3/1976 | Bykhovsky et al. | 219/121 P |

Primary Examiner—J. V. Truhe
Assistant Examiner—Fred E. Bell
Attorney, Agent, or Firm—Lackenbach, Lilling & Siegel

[57] ABSTRACT

A torch with a turbulized supply of a plasma forming gas comprises an electrode having a high-melting insert and a flat end face, and a nozzle with an internal surface having two mated portions: one cylindrical and one tapering; and the diameter of the electrode flat end face amounts essentially to 0.4–0.5 diameter of the electrode proper and the radius of conjugation of the nozzle cylindrical and tapering portions is equal essentially to the length of its cylindrical portion. Due to such a design, the inventive torch features a long service life of both the electrode and the nozzle.

9 Claims, 2 Drawing Figures

PLASMA ARC CUTTING TORCH

The present invention relates to plasma arc cutting of metals and more particularly to plasma arc cutting torches.

The invention may prove to be most advantageous in plasma cutting torches with a turbulized supply of a plasma forming gas.

Known in the art is a plasma cutting torch with a turbulized supply of a plasma forming gas, comprising an electrode with a cathode insert and a nozzle. Usually said electrode is shaped as a cup member and is produced of copper and cooled with a liquid or a gaseous coolant. The diameter of the above electrode is chosen to suit the arc current which in turn is determined by prescribed cutting conditions. It should be noted that as the current magnitude grows, thermal power set up in the electrode also increases, this preconditioning the selection of an electrode cooling unit which would ensure maximum electrode service life.

The material of the high-melting insert is dependent on the kind of the plasma forming gas adopted. Thus, air requires zirconium or hafnium inserts.

The electrode has a flat end face mating with the electrode side surface through a portion which is a part of the external surface of a torus. The internal surface of the nozzle has two portions, a cylindrical one and a tapering one, mated so as to make a part of the internal surface of a torus. In this case, the cylindrical portion has a length based upon the arc current to rule out double arc formation and adjoins the nozzle end face, whereas the tapering nozzle portion adjoins the flat electrode end face. The space defined by said electrode and nozzle surfaces is a torch chamber, wherein in which a plasma jet is formed and which will be referred to hereinafter as a forming chamber.

The electrode surface portion which is the part of the external surface of the torus, and the tapering portion of the nozzle internal surface are separated by an annular gap for the plasma forming gas to pass. The gas, which is preliminarily turbulized by a swirler, passes through said gap to enter the forming chamber in a vortex flow.

It is known that the geometry of the forming chamber and dimensional relations between its elements determine both the electrode and nozzle service life and the quality of a cutting plasma jet being shaped and, hence, that of the metal cutting process. Known in the art are two main types of the forming chambers employed in plasma arc cutting torches, i.e.:

1. A chamber defined by the flat electrode end face having a sharp or blunted edge, and by the nozzle whose tapering internal surface passes abruptly into a cylindrical one;

2. A chamber defined by the streamlined-configuration surfaces of an electrode and a nozzle, such as, spherical or parabolic for the electrode and toroidal or continually tapering for the nozzle.

In the chambers of both types the incoming vortex gas flow continually constricts and spatially stabilizes an arc column portion found within the chamber. The degree of constriction and spatial stabilization varies along the axis of the above arc column portion as a function of a vortex gas flow diagram that is determined by the electrode and nozzle surface configuration. The term "spatial stabilization of an active arc spot" is used here and hereafter to denote the ability of a cutting torch to sustain the active arc spot (an arc-electrode contact point) on the working end face of the insert along the electrode axis. Evidently, the gas flow diagram in the forming chamber of the first type is such that maximum constriction of the arc column is remote from the electrode, whereas in the chamber of the second type it maximally approaches the electrode. In this case the concentration of a thermal flux delivered from the arc column to the electrode, which denotes the amount of heat reduced to unit area of the electrode flat end face, will be minimum for the chamber of the first type and maximum for that of the second type. At the same time in the chamber of the first type spatial stabilization of the active arc spot along the electrode axis is diminished and in the chamber of the second type it is enhanced. This is evidenced by a specific configuration of an erosion crater formed in the electrode in both chambers during arcing. In the chamber of the first type a maximum crater base-to-height ratio is ensured, whereas in the chamber of the second type it is reduced to a minimum. Owing to a low concentration of a thermal flux delivered from the arc column to the electrode in the chamber of the first type the erosion rate of the high-melting insert is minimum, the term "the rate of erosion of the high-melting insert" is employed herein and hereafter to denote the insert linear consumption per unit time. However, a weakened effect of spatial stabilization of the active arc spot on the electrode owing to an insignificant erosion crater depth of the insert results in wandering of the cathode spot over the entire surface of the crater which causes an intense flashing of the copper cup member. In this case the emitting surface of the insert is coated with copper, which disturbs completely the spatial stabilization of the arc column, results in the striking of a double arc and rules out restriking the cutting arc. Thus, the electrode service life, defined as a product of the insert erosion rate by its maximum permissible usable length, in the chamber of the first type is very low. The term "critical length of consumption of the high-melting insert" denotes here and hereafter its length at which the cutting torch becomes no longer able to sustain the active arc spot on the working insert end face along the electrode axis.

In the chamber of the second type a maximum insert erosion rate is provided owing to high concentration of the thermal flux flowing from the arc column to the electrode, and, due to a small crater diameter, the arc column at a certain crater depth is shunted by the copper crater wall whose flashing also disturbs stable burning and rules out restriking of the cutting arc. Hence, in the chamber of the second type the electrode service life is also low.

The nozzle portion of the chambers of both the first and second types does not provide for high quality plasma jet shaping.

In the first case the sharp edge of the junction between the tapering and cylindrical surfaces of the nozzle brings about gas flow shocks turbulizing the plasma jet at the exit from the nozzle. The plasma jet becomes critical to the flow rate of the plasma forming gas which under industrial conditions obviates stable high-quality cuts or leads to arc extinction. Moreover, said surface junction edge is a factor contributing to double arc formation. In the chamber of the first type the shaping of the plasma jet in the off-nozzle portion of the torch could have been improved by extending the length of the nozzle cylindrical portion. However, it constitutes one more factor adding to the probability of double arc formation. As is known, the nozzle peculiar to the chamber of the first type operates reliably when the length of its cylindrical passage is equal to its diameter.

In the second case, when the nozzle surface has no cylindrical portion (see, e.g., Inventor's Certificate of the USSR No. 359111, B23k 9/16; B23k 17/00) the length of the most well-defined off-nozzle portion of the arc column that has a critical effect in providing vertical edges of the cut of a minimum possible width is in turn either lacking or strictly limited at best. However, in this latter case, owing to the streamlined shape of the nozzle surface the flow rate of the plasma forming gas can be varied over a broad range and the probability of both double arc formation or arc extinction can be minimized.

A possibility of using a nozzle with a constantly tapering working surface in combination with the electrode of the above design should be discussed separately. Such a nozzle would have promoted better shaping of the plasma jet; yet, an extremely long portion of the arc column within the torch brings about unproductive losses of electric power and diminishes materially the nozzle service life in view of heat overloads.

Both types of the forming chambers taken from the prior-art family of cutting torches may be considered to some extent as border-line cases making it possible to reveal most completely the effects of the chamber geometry on the electrode and nozzle service life and on the plasma jet shaping. In this case commonly known are two plasma cutting torches most closely resembling the plasma torch of the present invention. The first of these torches comprises an electrode with a developed flat end face having an external portion of a toroidal surface instead of the formerly sharp edge, this providing smooth transition from the flat end face to the side surface of the electrode. The toroidal surface ensures essentially favourable conditions for striking a pilot electrode-nozzle arc. Yet, this surface has a negligible influence on the vortex gas stream flowing around the electrode, owing to a small ratio between its radius of curvature and the diameter of the flat end face that does not exceed 0.3. The reliability of the above analysis of phenomena characteristic of the first torch is also confirmed by the fact that the geometry of the electrode burnout crater actually does not differ from that considered in the chamber of the first type.

The other torch comprises a nozzle with an internal surface portion smoothly passing into a passage. A disadvantage of such nozzle lies in arbitrary selection of the radius of curvature of the smooth transition surface which has a serious effect on both the location of the maximum constriction point of the arc column within the torch along the axis of the forming chamber, and on the probability of double arc formation.

The main object of the invention is the provision of a plasma cutting torch featuring a long electrode and nozzle service life.

These and other objects are achieved by providing a plasma torch with a turbulized supply of a plasma forming gas, comprising an electrode whose diameter is selected to suit the arc current and which has a high-melting insert and a flat end face mated with the electrode side surface through a portion which is a part of the external surface of a torus, and a nozzle whose internal surface has a cylindrical portion whose length is a function of the arc current and which adjoins the nozzle end face, and a tapering portion facing the electrode flat end face, said portions being mated so as to make a part of the internal surface of a torus, wherein, according to the invention, the diameter of the electrode flat end face is essentially equal to 0.4 - 0.5 diameter of the electrode proper and the radius of conjugation of the nozzle cylindrical and tapering portions amounts essentially to the length of its cylindrical portion.

The adopted flat end face diameter and the radius of conjugation of the nozzle cylindrical and tapering portions produce a forming chamber which ensures a long service life of both the electrode and the nozzle as compared with those of the prior-art torches of the type described.

With a view to ensuring high concentration of the arc thermal power along its length from the nozzle to metal being treated it is expedient that the electrode flat end face be spaced from the nozzle end face at a distance amounting essentially to 1.5 diameters of the electrode flat end face.

The nature of the invention will be clear from the following detailed description of a particular embodiment thereof, to be had in conjunction with the accompanying drawings in which.

Figure 1:
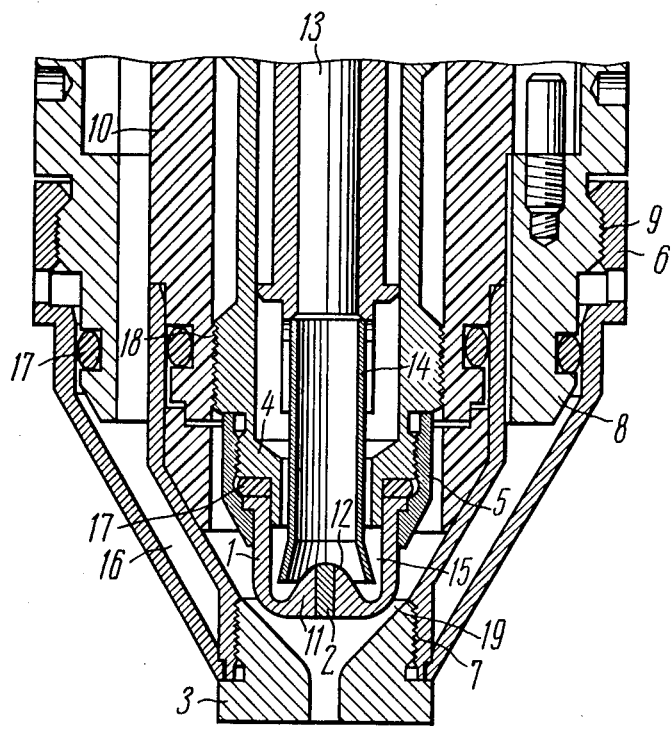
FIG. 1 is a longitudinal sectional view of a part of a plasma torch, according to the invention.

The proposed plasma torch comprises an electrode 1 (FIG. 1) with a high-melting insert 2 and a nozzle 3.

The electrode 1 is coaxially fixed on an electrode holder 4 with the aid of a union nut 5 and is coupled to a power supply source (not shown in the drawings) through the electrode holder 4. The nozzle 3 is fastened to a nozzle holder 6 by means of a threaded joint 7. The nozzle holder 6 is connected to the electrode holder 4 through intermediate members 8 by means of a number of threaded joints 9 is electrically insulated from the electrode holder 4 with the help of dielectric 10. The nozzle holder 6 is electrically associated with the other pole of the power supply source.

The electrode 1 is hollow and has a bottom 11. An internal surface 12 of the bottom 11 approximates in shape, a paraboloid whose apex faces a space 13 of the electrode 1. The space 13 is in communication with a coolant supply system (not shown in the drawing) and is adapted for feeding coolant directly to the electrode 1. The high-melting insert 2, which can be made of zirconium, hafnium or in other high-melting metals, is fixed in the bottom 11 of the electrode 1 along axis, its one end of the insert adjoining the external end face of the electrode 1 and the other end extending into the space 13. Owing to such design the high-melting insert 2 is in direct contact with the coolant, a feature enhancing heat removal from the insert 2 during arcing. To discharge the coolant from the electrode 1 the electrode space 13 accommodates a pipe 14 aligned axially therewith and mounted with a gap 15 between the internal side surface of the electrode 1 and the external surface of the pipe 14. The gap 15 communicates with a coolant discharge system (not shown in the drawing).

Heat removal from the nozzle 3 is effected through an annular space 16 provided in the nozzle holder 6 and also coupled with the coolant supply system. The space 16 and gap 15 through which the coolant is flowing are sealed by the known procedure, e.g., with the aid of a number of ring packings 17.

To provide for turbulized supply of a plasma forming gas the torch comprises a swirler 18 which is formed by a multistart screw thread providing passages on the external surface of the electrode holder. The passages are on one side connected to a plasma forming gas supply system (not shown in the drawing), whereas on the other side they are in communication with a gap 19 between the electrode 1 and nozzle 3.

Figure 2:
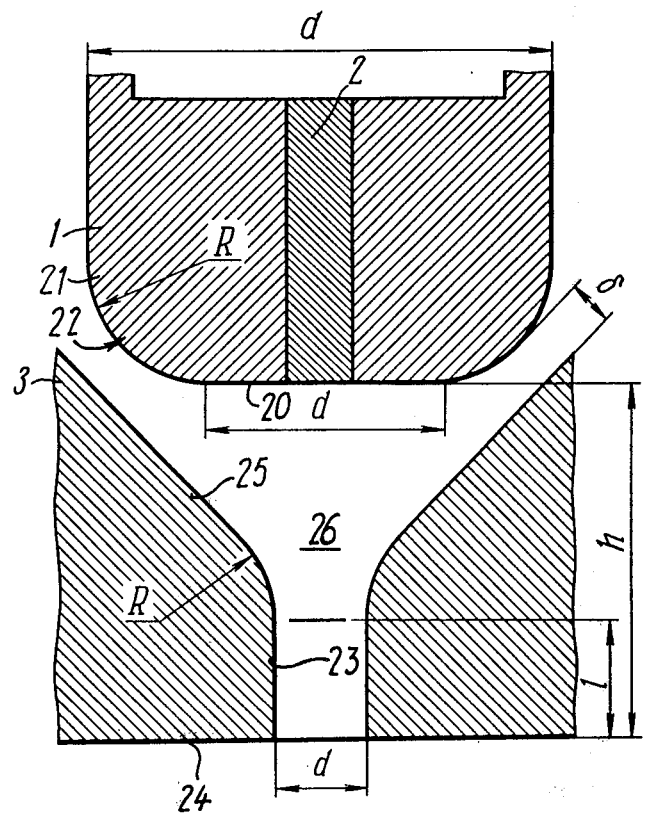
FIG. 2 is a longitudinal sectional view of a forming chamber defined by electrode and nozzle surfaces, according to the invention.

The electrode 1 has a flat end face 20 (FIG. 2) mating with an external surface 21 of the electrode 1 through its portion 22 which is a part of the external surface of a torus. The diameter of the electrode 1 is selected to suit the arc current which is determined by prescribed cutting conditions (metal grade, its gauge and cutting rate).

The internal side surface of the nozzle 3 has a cylindrical portion 23 whose length is also the function of the arc current and which adjoins an end face 24 of the nozzle 3, and a tapering portion 25 facing the flat end face 20 of the electrode 1, said portions mated with each other. The junction of the cylindrical portion 23 and the tapering portion 25 constitutes a part of the internal surface of a torus. According to the invention, the diameter of the flat end face 20 of the electrode 1 is essentially equal to 0.4 – 0.5 diameter of the electrode 1 proper. As for the nozzle 3, the radius of conjugation of its cylindrical portion 23 and tapering portion 25 amounts essentially to the length of its cylindrical portion 23. Owing to these relationships the geometry of a forming chamber 26 ensures a maximum possible service life of the electrode 1 and nozzle 3 under otherwise equal conditions (the cooling system and plasma forming gas flow rate), as compared with the prior-art torches of the type described.

When the diameter of the flat end face 20 exceeds 0.5 diameter of the electrode 1 proper, the thermal flux delivered from the arc column to the flat end face 20 of the electrode 1 has a minimum concentration, this being evidenced by a tubular burnout crater at the end of the electrode 1. However, in this case spatial stabilization of an active arc spot along the axis of the electrode 1 is diminished. In this case low concentration of the thermal flux from the arc column to the electrode 1 results in a correspondingly low erosion rate of the high-melting insert 2 which would have prolonged the service life of the electrode 1. Yet, the weakened effect of spatial stabilization of the active arc spot on the electrode 1 restricts abruptly the consumption of the high-melting insert 2 along its length which in turn decreases the service life of the electrode 1.

In case use is made of a torch with the flat end face 20 of the electrode 1 less than 0.4 diameter of the electrode 1 proper, the concentration of the thermal flux flowing to the flat end face 20 of the electrode 1 grows substantially which causes an appropriate increase in the erosion rate of the high-melting insert 2.

However, in spite of enhanced spatial arc stabilization that takes place in this case, the formation of a shallow crater at the end of the electrode 1 restricts burning-out (utilization) of the insert 2 along its length, since the arc column is shunted by the crater walls making further arcing impossible, which also diminishes materially the service life of the electrode 1.

As previously pointed out, the nozzle 3 features a maximum service life when the radius of conjugation of its cylindrical portion 23 and tapering portion 25 is equal essentially to the length of the cylindrical portion 23. Where this prerequisite is not observed, in one case (with the conjugation radius less than the length of the cylindrical portion 23) the probability of double arc formation increases, and the service life of the nozzle 3 diminishes accordingly, whereas in the other case (with the conjugation radius exceeding the length of the cylindrical portion 23) the thermal flux to the nozzle 3 increases which results in unproductive losses of the torch thermal power or even in a failure of the nozzle 3.

Taking into account the above considerations, the torch service life may be concluded to be a function of both the service life of the electrode 1 and of the nozzle 3.

As is known, high concentration of the arc thermal power along its length from the nozzle 3 to the metal being treated ensures a high rate and quality of cutting. In this connection we have found that the flat end face 20 of the electrode 1 must be spaced from the end face 24 of the nozzle 3 at a distance amounting essentially to 1.5 diameters of the flat end face 20 of the electrode 1. A greater spacing causes unproductive losses of the torch thermal power decreasing the cutting rate, whereas at a distance less than the above-specified value the thermal power concentration along the arc length (from the nozzle 3 to the metal being treated) diminishes which adversely affects the quality of the cutting process.

In the Table which follows specific examples of preferred embodiments of the present invention are given by way of illustration in terms of parameters thereof.

| Thickness of low-carbon steel to be cut, mm | Cutting current, A | Cutting rate, m/min | Dimensions, mm | | | | |
|---|---|---|---|---|---|---|---|
| | | | D | d | l | R | h |
| 10 | 200 | 4 | 11 | 5 | 3 | 3 | 7 |
| 100 | 400 | 0.2 | 16 | 8 | 5 | 5 | 12 | where
D — electrode diameter,
d — diameter of electrode flat end face,
l — length of nozzle cylindrical portion,
R — radius of conjugation of nozzle tapering and cylindrical portions,
h — distance between electrode flat end face and nozzle end face.

The plasma torch operates in the following manner.

Coolant is fed into the space 13 of the electrode 1 and annular space 16 of the nozzle holder 6. Following that gas is supplied into the swirler 18 from the plasma forming gas supply system. Gas from the swirler 18 enters the gap 19 between the electrode 1 and the nozzle 3 and flows around the cylindrical portion 23 of the nozzle 3.

After that a pilot arc is established between the electrode 1 and the nozzle 3 in the gap 19 to draw the cutting arc between the electrode 1 and the metal being treated. The plasmal forming gas constricts the arc in the forming chamber 26 to obtain a highly-concentrated thermal flux directed to the metal, cutting of the metal being thus effected.

What we claim is:

1. A plasma torch comprising an electrode which has a diameter selected to suit an arc current and which has a side surface and a flat end face whose diameter is selected to be in the range of approximately 0.4 – 0.5 of the electrode diameter, said side surface and said flat end of said electrode mating with each other through a portion which is a part of the external surface of a torus; and a nozzle which has a flat end face and an internal surface having cylindrical and tapering portions, said cylindrical portion having a length selected to correspond to the arc current and adjoining said nozzle flat end face, said tapering portion facing said flat end face of said electrode, said tapering and cylindrical portions being mated with each other along a radius that is substantially equal to the length of said cylindrical portion of the internal surface of said nozzle so as to make a part of the internal surface of a torus, and said flat electrode end face being spaced from said nozzle end face at a distance approximately equal to 1.5 diameters of said electrode flat end face.

2. A plasma torch as defined in claim 1, further comprising means for turbulizing the supply of a plasma forming gas in the torch.

3. A plasma torch as defined in claim 1, further comprising cooling means for cooling said electrode.

4. A plasma torch as defined in claim 1, further comprising a high-melting insert in said electrode.

5. A plasma torch as defined in claim 1, wherein said electrode has an internal surface facing in a direction away from said nozzle.

6. A plasma torch as defined in claim 5, wherein said internal surface approximates the shape of a paraboloid whose apex is the most remote portion of said internal surface from said electrode flat end face.

7. A plasma torch as defined in claim 5, further comprising a high-melting insert in said electrode.

8. A plasma torch as defined in claim 7, wherein said high-melting insert extends between said electrode flat end face and said internal surface.

9. A plasma torch as defined in claim 8, wherein said high-melting insert has a length equal to the maximum distance between said electrode flat end face and said internal surface apex.

* * * * *

UNITED STATES PATENT AND TRADEMARK OFFICE
CERTIFICATE OF CORRECTION

PATENT NO. : 4,059,743
DATED : November 22, 1977
INVENTOR(S) : Eduard Migranovich Esibian, et al.

It is certified that error appears in the above-identified patent and that said Letters Patent are hereby corrected as shown below:

On the first page, left hand column, after the line "[22]" identifying the filing date of the patent application, insert the following:

--[30]   Foreign Application Priority Data

Oct. 28, 1974   U.S.S.R............. 2067852--

Signed and Sealed this

Twenty-first Day of November 1978

[SEAL]

Attest:

RUTH C. MASON
Attesting Officer

DONALD W. BANNER
Commissioner of Patents and Trademarks